United States Patent [19]
Aho et al.

[11] Patent Number: 4,719,736
[45] Date of Patent: Jan. 19, 1988

[54] REMOVABLE WINDOW ASSEMBLY

[75] Inventors: Jack R. Aho, Clawson; Roger J. Dingman, Rochester; Larry R. Gee, Utica; Leon R. Szlachta, St. Clair Shores, all of Mich.

[73] Assignee: General Motors Corporation, Detroit, Mich.

[21] Appl. No.: 880,102

[22] Filed: Jun. 30, 1986

Related U.S. Application Data

[63] Continuation of Ser. No. 648,280, Sep. 6, 1984, abandoned.

[51] Int. Cl.⁴ .......................... D60J 1/00; E06B 3/54; E06B 7/00
[52] U.S. Cl. .......................................... 52/397; 52/99; 296/201
[58] Field of Search .................. 52/98, 99, 397, 208, 52/127.1, 400; 296/201, 93; 49/141, 466; 220/279, 280

[56] References Cited

U.S. PATENT DOCUMENTS

| | | | |
|---|---|---|---|
| 3,574,024 | 4/1971 | Rose | 156/108 |
| 3,672,109 | 6/1972 | Erck | 52/397 |
| 3,807,107 | 4/1974 | Davis | 52/99 |
| 4,093,304 | 6/1978 | Ziegler | 296/84 D |
| 4,301,939 | 11/1981 | Pupp | 220/279 X |
| 4,436,337 | 3/1984 | Bowes et al. | 52/400 X |
| 4,532,741 | 8/1985 | Knudel | 52/397 X |

FOREIGN PATENT DOCUMENTS

| | | |
|---|---|---|
| 93283 | 12/1983 | European Pat. Off. . |
| 669731 | 3/1955 | Fed. Rep. of Germany . |

Primary Examiner—Stanley N. Gilreath
Assistant Examiner—Lynn M. Sohacki
Attorney, Agent, or Firm—Patrick M. Griffin

[57] ABSTRACT

An improved window assembly of the type that has a molded frame adhesively joined to the flange of the vehicle window opening includes means allowing it to be easily removed without significant damage and with access from only interior of the vehicle, as well as to be reinstalled easily. A cutting wire held in a groove surrounding the location of the adhesive bead has its terminal ends accessible from inside the vehicle. To remove the window, the wires are pulled from the interior of the vehicle, pulling the wire from the retention groove, past a flexible adhesive dam, and cutting completely through the adhesive bead. The window assembly may be combined with removable and reusable mechanical fasteners to both temporarily retain the window assembly as the adhesive cures, and to be reused to reinstall the window after its removal.

1 Claim, 8 Drawing Figures

REMOVABLE WINDOW ASSEMBLY

This is a continuation of application Ser. No. 648,280, filed on Sept. 6, 1984, now abandoned.

This application relates to window assemblies and specifically to a window assembly for a vehicle or the like of the type attached by an adhesive bead.

BACKGROUND OF THE INVENTION

There is a growing trend in vehicle window assemblies to provide a one-piece unit, sometimes called a modular assembly, in which a frame or gasket of PVC is molded to the periphery of the window glass panel. These window assemblies may be installed by adhesively bonding a portion of the inner surface of the molded frame to the flange that defines the window opening in the vehicle, as opposed to mechanical attachment by screws or like fasteners. If the frame is particularly thick, or if the flange to which it is bonded is far removed from the outer surface of the frame, it may be difficult or nearly impossible to reach the bead to break it by conventional means. Access may also be made difficult if a molded lip on the outer surface of the frame covers the gap between the frame and the surrounding outer panels of the vehicle. This presents a problem if it is desired to remove and reinstall the window assembly, such as to repair a water leak.

There are disadvantages and drawbacks to known methods of removing adhesively installed windows which make them inapplicable to the type of window assembly described above. In the case of windshields that have only a window panel without a molded frame, it is practical to cut the adhesive bead from the outside of the vehicle, since it is easily accessible. This may be done by inserting a cutting wire through the gap between the edge of the window panel and the surrounding vehicle body panels, and then pulling it through from the inside of the vehicle to cut the bead. Generally, only a decorative molding, easily removed, blocks access to that gap. The pulling of the wire may be done by hand, and it is also known to use a winding device such as that shown in European Pat. No. 93-283-A2. The Rose U.S. Pat. No. 3,574,024, shows an adhesive bead which has a central heating wire therein, the ends of which are accessible from inside the vehicle. While the primary purpose for the wire is to carry an electric current to heat cure the adhesive bead, the ends of the wire may be grasped from inside the vehicle and stripped through half of the bead. However, outside access would still be necessary to cut the rest of the bead. That access is not likely to be available in a modular window assembly.

Known methods for removing a vehicle window assembly with access from the inside only also have drawbacks which make them inapplicable to modular window assemblies. The Ziegler U.S. Pat. No. 4,093,304, shows an adhesively bonded windshield in which a metal strip is crimped over the pinchweld flange that defines the window opening, under the entire extent of the adhesive bead. The bead can then be broken by stripping the metal strip from the flange. However, while only inside access is neccessary, it is necessary along the entire flange. In addition, the use of a separate structural piece which must be attached to the flange defeats the primary advantage of a modular window assembly, which is that it may be installed as a single unit in a single step. German patent application No. 669731-3.11.55 shows a window which, although not adhesively installed, does have a resilient peripheral gasket with a cutting wire embedded in a groove therein. The wire is accessible from the inside of the vehicle, and is stripped through the gasket, cutting it all the way through around its entire periphery. Such a method would be suitable only in a window assembly of this older type in which the sealing gasket is a separate unit that may be easily replaced. Cutting through such a large portion of a gasket molded to a window panel would either destroy it or damage it too greatly to reinstall successfully.

SUMMARY OF INVENTION

The invention provides an improved window assembly of the type described above which may be easily and completely removed with access only from inside the vehicle, and without significant damage to the assembly so that it may be easily reinstalled.

The modular window assembly of the invention has a window panel with a surrounding frame or gasket molded to its peripheral edge. The window opening into which the window assembly is installed is defined by a pinchweld flange that is relatively distant from the surrounding outer body panels of the vehicle, and the frame is consequently relatively thick. The molded frame has an outer surface which faces the outside of the vehicle and a bonding portion which is adapted to be spaced from and bonded to the flange by an adhesive bead. The bonding portion and adhesive bead are, therefore, not easily accessible from outside the vehicle.

The molded frame further includes a wire retention groove molded or otherwise defined therein that completely surrounds the bonding portion of the frame, and which is located between the bonding portion and the outer surface of the frame. The groove is of a size suitable to retain a cutting wire which may be placed therein prior to adhesively installing the window to the window opening flange. The groove also locates the wire in a position intermediate the flange and the bonding portion of the frame after the window assembly has been adhesively installed.

The molded frame also includes a resilient wall integrally molded therewith and defining an adhesive dam that extends completely around the wire retention groove, between the wire retention groove and the bonding portion of the frame. This resilient wall engages the window opening flange as the window assembly is installed and prevents the adhesive bead from moving past the wire retention groove and the cutting wire retained therein. The resilient wall is also sufficiently resilient to allow the terminal ends of the cutting wire to extend beneath it and to the interior of the vehicle while still confining the adhesive bead.

After the cutting wire is placed into the wire retention groove, a bead of adhesive is applied to the bonding portion of the frame. As the window assembly is installed into the window opening from outside the vehicle, the resilient wall engages the flange, confining the adhesive bead to its desired location. The terminal ends of the wire are run beneath the resilient wall to the interior of the vehicle and are hidden by a suitable removable interior molding. The wire ends are then accessible if it should become necessary to remove the window assembly.

The window assembly may be removed by pulling the wire ends from the inside of the vehicle, pulling the wire out of the groove and beneath the resilient wall.

Since the adhesive bead is confined entirely inside of the retention groove, and since the cutting wire is located intermediate the bonding portion of the frame and the flange, the wire will cut entirely through the adhesive bead. The resilient wall flexes during the bead cutting process, and the window assembly is not significantly damaged. Therefore, a new wire may be added to the retention groove and the assembly reinstalled with another adhesive bead.

In addition, the window assembly of the invention may be combined with suitable mechanical fasteners which will provide temporary retention of the window assembly to the flange as the adhesive cures, without interfering with the removal process. Both threaded fasteners applied from inside the vehicle and flexible fasteners which snap past the flange as the assembly is installed from outside the vehicle are disclosed. In addition, the mechanical fasteners may be reused for the reinstallation of the window assembly, as they do not interfere with and are not all damaged by the removal process.

It is, therefore, an object of the invention to provide an improved window assembly of the type having a molded frame adhesively secured to a window opening flange which may be easily and completely removed with access from inside the vehicle only.

It is another object of the invention to provide such an improved window assembly in which a cutting wire designed to completely cut the adhesive bead may be included in the frame of the window assembly before it is adhesively installed into the vehicle window opening.

It is a further object of the invention to provide an improved window assembly in which the molded frame includes a resilient wall designed to engage a window opening flange when the assembly is adhesively installed to confine the adhesive bead to the inside of a cutting wire retained in a wire retention groove in the frame, a groove that locates the wire in a proper position to cut through the adhesive bead when the ends of the wire are pulled from the interior of the vehicle.

It is still a further object of the invention to provide such an improved window assembly in which a resilient wall molded integrally with the frame acts both to confine the adhesive bead and to form a resilient wall of the wire retention groove that will flex as the cutting wire is pulled therefrom, thus allowing the adhesive bead to be cut without significant damage to the frame, so that the window assembly may be reinstalled after its removal.

It is yet another object of the invention to provide such a window assembly in combination with mechanical fasteners which do not interfere with the removal and may be used in the reinstallation of the window assembly after its removal.

BRIEF DESCRIPTION OF THE DRAWINGS

These and other objects are advantages of the invention and will appear from the following written description and drawings in which.

DESCRIPTION OF THE PREFERRED EMBODIMENT

Figure 1:
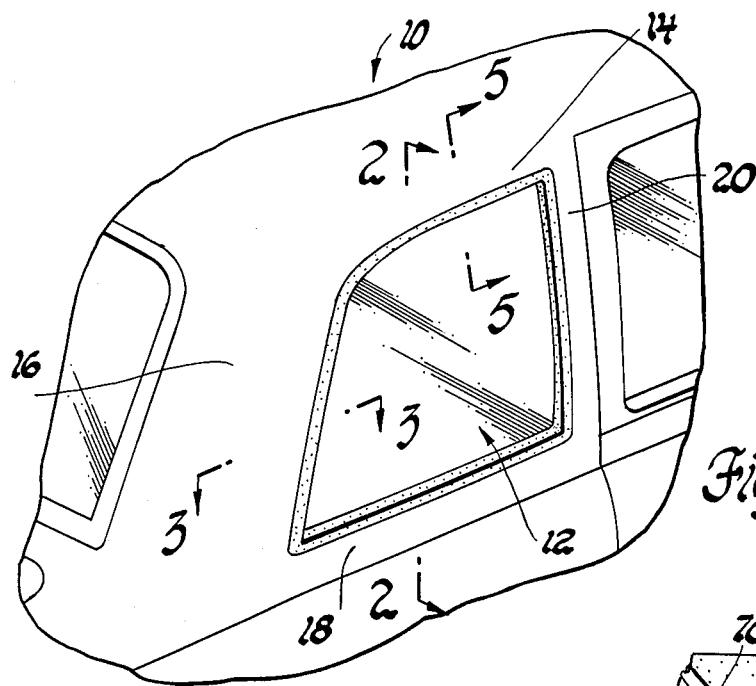
FIG. 1 is a partial perspective view of a vehicle showing the improved window assembly of the invention installed thereto.

Referring first to FIG. 1, a portion of a vehicle designated generally at 10 includes an embodiment of the window assembly of the invention, in this case a modular quarter window assembly 12. Window assembly 12 is installed into a window opening, not visible in FIG. 1, which is surrounded by roof panel 14, sail panel 16, quarter panel 18, and door pillar 20. It is to be understood that the invention can be embodied in any fixed window of a vehicle or the like.

Figure 3:
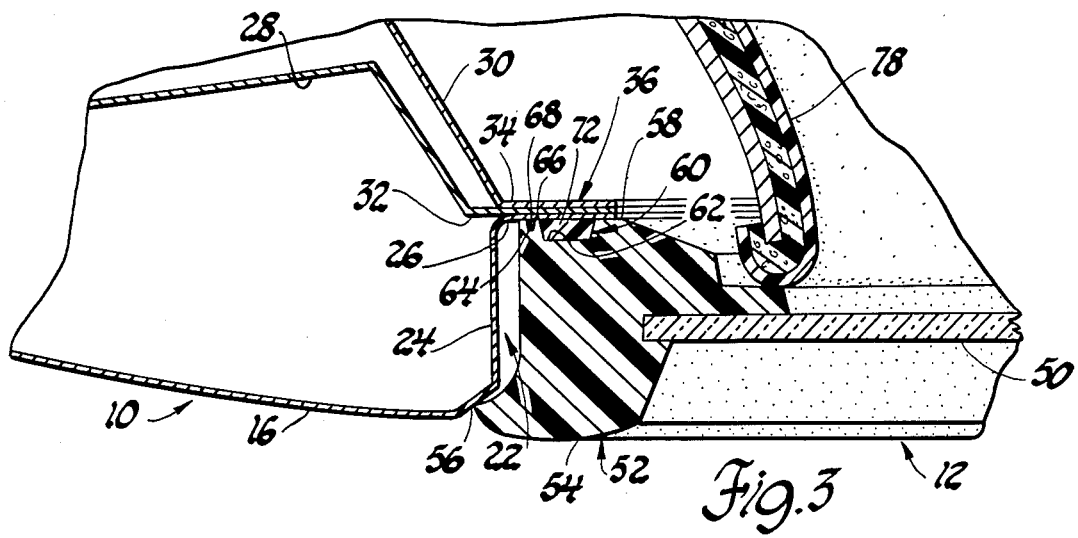
FIG. 3 is an enlarged view taken along the line 3—3 of FIG. 1.
Figure 5:
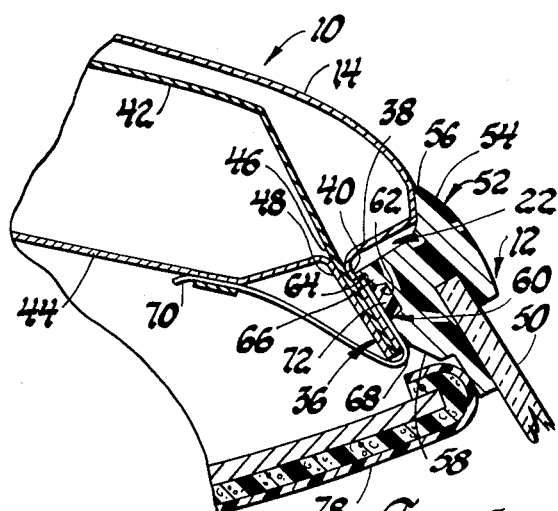
FIG. 5 is an enlarged view taken along the line 5—5 of FIG. 1.

Referring next to FIGS. 3 and 5, details of the window opening designated generally at 22 may be seen. Referring first to FIG. 3, sail panel 16 includes a relatively deep inwardly extending wall 24, and a shorter flange 26 extending generally perpendicular to wall 24. A pair of inner reinforcing panels 28 and 30 also terminate in flanges 32 and 34 respectively. Flanges 26, 32 and 34 are abutted and welded together to form part of a peripherally extending pinchweld flange designated generally at 36. As seen in FIG. 5, roof panel 14 also includes an inwardly extending wall 38 and a flange 40 perpendicular thereto. A pair of inner reinforcing panels 42 and 44 terminate in flanges 46 and 48 respectively. In similar fashion, flanges 40, 46 and 48 are welded together to form another part of pinchweld flange 36. Pinchweld flange 36 is formed in similar fashion to define the entire periphery of window opening 22. It may be seen that, because of the relative depth of the inwardly extending walls 24 and 38, pinchweld flange 36 is relatively far removed from the body panels surrounding opening 22.

Figure 2A:
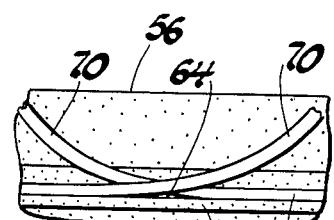
FIG. 2a shows a portion of FIG. 2 enlarged.
Figure 2:
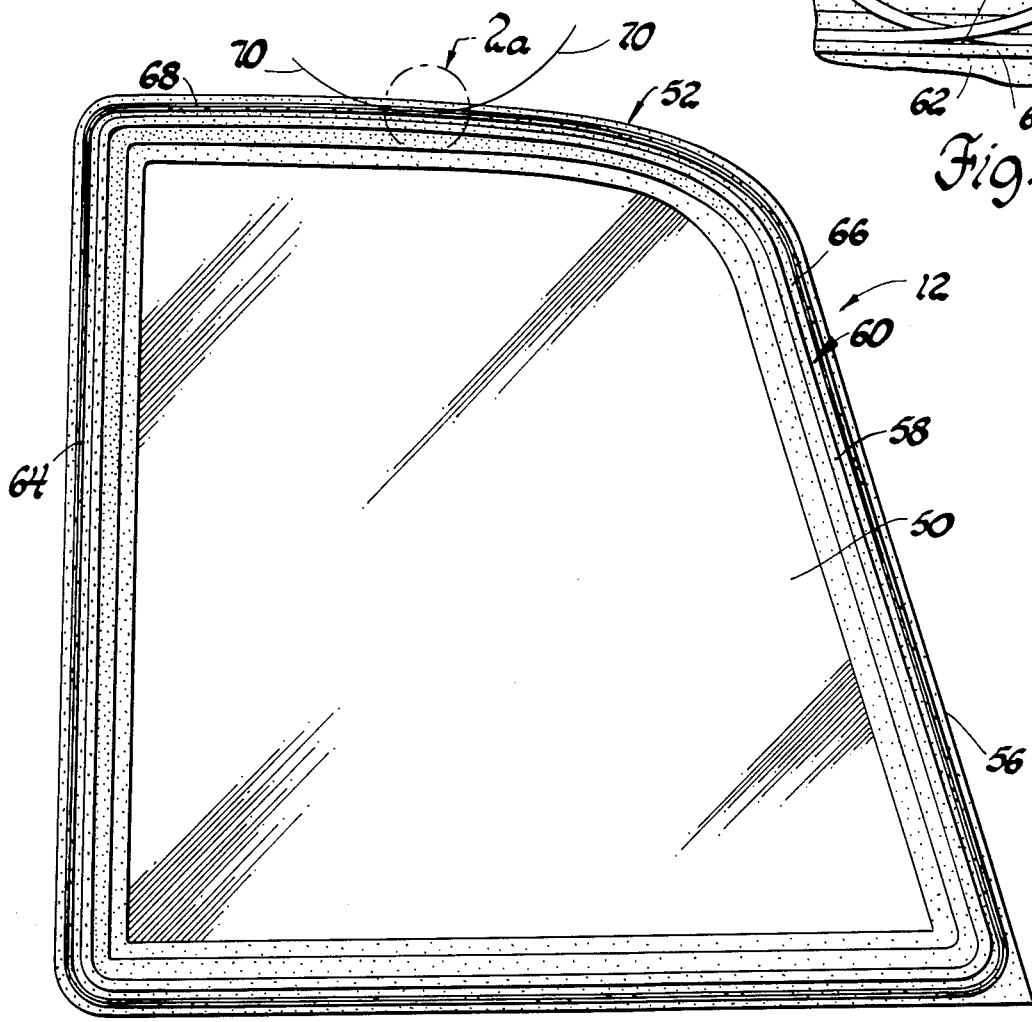
FIG. 2 is a view of the inside of the window assembly of the invention from the perspective of line 2—2 of FIG. 1, but showing the window assembly before installation.

Referring next to FIGS. 2 and 3, details of the window assembly 12 may be seen. Window assembly 12 includes a glass window panel 50 and a molded frame or gasket designated generally at 52. Frame 52 may be formed of PVC or other suitable material and injection molded around the peripheral edge of window panel 50 in conventional fashion. Frame 52 has an outer surface 54 terminating in a lip 56. The inner surface 58 of frame 52 includes a continuous mounting groove designated generally at 60, the bottom wall 62 of which is inset from inner surface 58. Inner surface 58 also includes a wire retention groove 64 molded therein extending completely around mounting groove 60, between mounting groove 60 and outer surface 54. Because of the proximity of grooves 60 and 64, that part of frame 52 therebetween comprises a shared resilient wall 66. One side of resilient wall 66 faces bottom wall 62 and the other side forms a wall of wire retention groove 64. It is conceivable that grooves 60 and 64 could, with a wider frame 52, be spaced farther apart. However, there is an economy of space and structure in the shared resilient wall 66, which also serves another purpose to be described below.

Wire retention groove 64 is sized so that a cutting wire 68 is tightly held therein and retained to the frame 52 as a unitary structure. The depth of wire retention groove 64 locates cutting wire 68 intermediate bottom wall 62 of mounting groove 60 and inner surface 58 of frame 52. As may be best seen in FIGS. 2 and 2a, the terminal ends 70 of cutting wire 68 are crossed over one another at the top of frame 52 and extend therebeyond a distance sufficient to be gripped. It will be noted also in FIG. 2 that after wire 68 is in place, mounting groove 60 is completely surrounded thereby. Since the window assembly 12 is a modular unit which it would likely be desired to ship complete, the terminal ends 70 of wire 68 could be taped to window panel 50 during shipping. Of course, wire 68 could be placed into wire retention groove 64 just prior to the adhesive installation of window assembly 12, which will be described next. Either way, the window assembly 12 and wire 68 together would comprises a unitary structure, one that could be shipped, handled and installed as a unit, with the wire 68 already properly located.

To install window assembly 12, a bead 72 of suitable adhesive, such as polyurethane, is placed into mounting groove 60, all the way therearound. As window assembly 12 is placed into window opening 22 from outside of vehicle 10, the inner surface 58 of frame 52, and especially the edge of resilient wall 66, engage pinchweld flange 36. Bottom wall 62 is thereby located spaced from flange 36, with wire 68 intermediate bottom wall 62 and flange 36. Adhesive bead 72 is compressed as window assembly 12 is pushed into place and fills mounting groove 60. Resilient wall 66 prevents adhesive bead 72 from moving in the direction toward the outer surface 54 and the outside of vehicle 10. This confinement insures that adhesive bead 72 will be completely surrounded by cutting wire 68. Most broadly, bottom wall 62 may be thought of as the portion of frame 52 that is adhesively bonded to flange 36, since mounting groove 60 need not have another wall to prevent bead 72 from moving toward the interior of vehicle 10. However, it is convenient that mounting groove 60 be closed in both directions.

Figure 4:
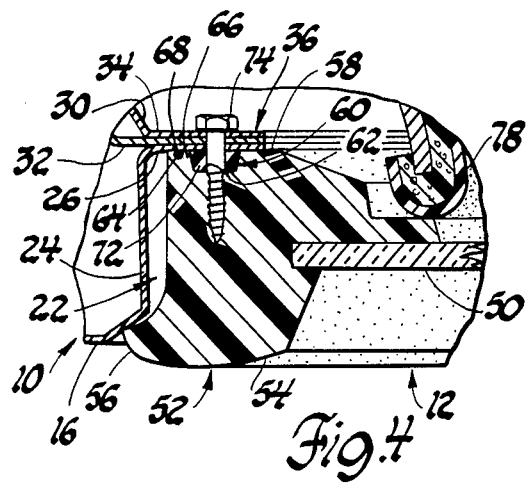
FIG. 4 is a view similar to FIG. 3 showing the use of a mechanical fastener.
Figure 7:
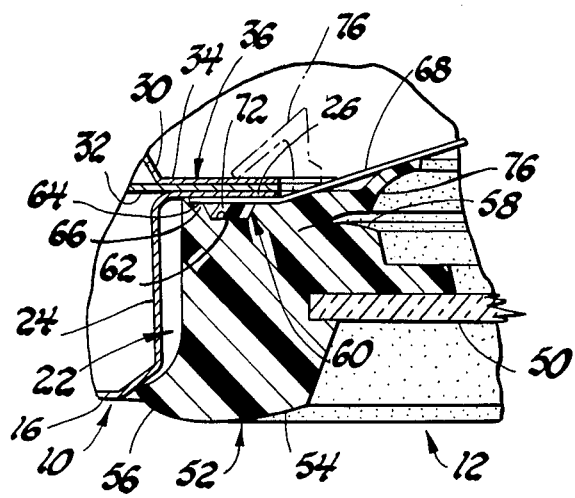
FIG. 7 is a view similar to FIG. 6 showing another mechanical fastener during the removal of the window assembly.

Since adhesive bead 72 may take some hours to cure completely, it may be desired to mechanically retain window assembly 12 in place temporarily until that curing occurs. Two possible mechanical fasteners are shown in FIGS. 4 and 7, and they may be used separately or together. FIG. 4 shows a threaded screw 74 passing through pinchweld flange 36, through adhesive bead 72 and into frame 52. Screw 74 may be self tapping, or may tap into a preformed hole in frame 52. FIG. 7 shows a flexible hook 76, similar to a molding clip, which is molded integrally with the inside surface 58. Hook 76 flexes and snaps past pinchweld flange 36 to the dotted line position as window assembly 12 is pushed in place. Both of these fasteners provide enough holding force to allow bead 72 to cure, but neither would interfere with the removal of window assembly 12, as will be next described. As a final step, the terminal ends 70 of wire 68 are taped or otherwise temporarily attached to reinforcement panel 44, as seen in FIG. 5. A removable trim molding 78 is then attached to the interior of vehicle 10 all the way around the inside of pinchweld flange 36 to conceal inner surface 58 and wire 68.

Figure 6:
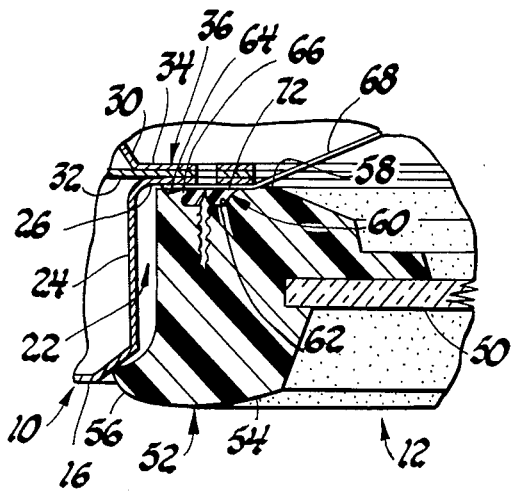
FIG. 6 is a view similar to FIG. 4 showing the window assembly in the process of being removed.

It will be appreciated that, given the relative depth of inwardly extending wall 24, as seen in FIG. 3, the adhesive bead 72 is not easily accessible from the outside of vehicle 10. In addition, lip 56, which is not removable, blocks access. Should it be desired to remove window assembly 12 intact, such as to repair a water leak, this may be simply done with the invention. After removing molding 78, any fasteners such as screws 74 would be removed, as seen in FIG. 6. The terminal ends 70 of cutting wire 68 would be untaped, grasped, and pulled inwardly all along pinchweld flange 36, as seen in FIGS. 6 and 7. Since wall 66 is resilient, wire 68 will easily exit from retention groove 64 and slide beneath the edge of wall 66 as it flexes, without damage thereto. In addition, because of the location of cutting wire 68 provided by the wire retention groove 64 and the confinement of bead 72 as described, bead 72 will be cleanly and completely cut through. Any fasteners such as hook 76 will flex and be moved out of the way as wire 68 is pulled, as seen in solid lines in FIG. 7.

Once window assembly 12 has been removed, the remainder of bead 72 may be removed, wire 68 reinstalled in retention groove 64, and a new bead of adhesive applied. Alternatively, since the cut through bead 72 will be relatively clean, a thin layer of adhesive could be applied to the cleanly cut edges thereof. A fastener such as screw 74 could then be used again in the reinstallation of window assembly 12, as could hook 76. Furthermore, if a fastener such as hook 76 were cut through or broken off by cutting wire 68, then a fastener such as screw 74 could still be used in the reinstallation process, whether or not they were used in the initial installation process. There is, therefore, a great deal of flexibility to the window assembly of the invention.

It will be understood that the invention is capable of embodiment in structures other than those disclosed, and is not intended to be so limited.

The embodiments of the invention in which an exclusive property or privilege is claimed are defined as follows:

1. An improved window assembly of the type adapted to be adhesively installed to a flange defining a window opening in a vehicle or the like, said window assembly having a molded frame with an outer surface facing the outside of the vehicle, said frame further having a bonding portion adapted to be spaced from the flange and bonded thereto by a curable adhesive bead, said improvement providing means for allowing the installed window assembly to be easily removed without significant damage with access only from the interior of the vehicle, and to be reinstalled after removal, comprising;

a cutting wire,
   a wire retention groove defined in the frame and extending completely around the bonding portion between said bonding portion and the outer surface of the frame, said groove being sized so that said cutting wire is tightly held in said groove and thereby retained to said molded frame as a unitary structure prior to said window assembly being adhesively installed, said groove also serving to locate said wire spaced from said flange by less than said bonding portion after the window assembly is installed,
   an adhesive dam integral with the frame and extending completely around the wire retention groove between said wire retention groove and the bonding portion, said adhesive dam being adapted to engage the window opening flange when the window assembly is installed to prevent the adhesive bead from moving past the wire retention groove toward the outer surface of the frame, said dam also being sufficiently resilient to flex without damage as the cutting wire is pulled beneath it, and flexible mechanical fasteners adapted to snap past said flange and temporarily retain said window assembly to said flange until said adhesive bead cures, whereby the installed window assembly may be removed by pulling the terminal ends of the cutting wired from the vehicle interior, thereby pulling said cutting wire from the wire retention groove between the flexing adhesive dam and the flange to flex said flexible fasteners away from said flange and to completely cut through the adhesive bead without significant damage to the frame and flexible fasteners, said window assembly thereupon being reinstallable by applying a new bead of adhesive and reusing said flexible fasteners.

* * * * *